United States Patent [19]

Zhang

[11] Patent Number: 5,216,668
[45] Date of Patent: Jun. 1, 1993

[54] MODULATED NONBLOCKING PARALLEL BANYAN NETWORK

[75] Inventor: Ning Zhang, Danville, Calif.

[73] Assignee: Pacific Bell, San Francisco, Calif.

[21] Appl. No.: 746,959

[22] Filed: Aug. 19, 1991

[51] Int. Cl.[5] ............................................... H04J 3/26
[52] U.S. Cl. ..................................... 370/60; 370/58.1; 370/94.1
[58] Field of Search ............... 370/53, 54, 58.1, 60, 370/60.1, 65, 65.5, 85.2, 85.5, 94.1, 94.2, 94.3, 99; 340/825.79, 825.8; 379/219, 220, 271, 272

[56] References Cited

U.S. PATENT DOCUMENTS

| | | | |
|---|---|---|---|
| 4,491,945 | 1/1985 | Turner | 370/60 |
| 4,602,365 | 7/1986 | White et al. | 370/85.5 |
| 4,651,318 | 3/1987 | Luderer | 370/60 |
| 4,661,947 | 4/1987 | Lea et al. | 370/60 |
| 4,670,871 | 6/1987 | Vaidya | 370/60 |
| 4,761,780 | 8/1988 | Bingham et al. | 370/60 |
| 4,785,446 | 11/1988 | Diaz et al. | 370/58.1 |
| 4,788,679 | 11/1988 | Kataoka | 370/60 |
| 4,797,880 | 1/1989 | Bussey, Jr. et al. | 370/60 |
| 4,813,038 | 3/1989 | Lee | 370/60 |
| 4,817,084 | 3/1989 | Arthurs et al. | 370/60 |
| 4,866,701 | 9/1989 | Giacopelli et al. | 370/60 |
| 4,893,304 | 1/1990 | Giacopelli et al. | 370/60 |
| 4,905,224 | 2/1990 | Lubojinsky | 370/60 |
| 4,912,701 | 3/1990 | Nicholas | 370/94.1 |
| 5,043,980 | 8/1991 | Day, Jr. et al. | 370/60 |

Primary Examiner—Douglas W. Olms
Assistant Examiner—Alpus H. Hsu
Attorney, Agent, or Firm—Townsend and Townsend Khourie and Crew

[57] ABSTRACT

A packet routing network for outputting information packets from a plurality of network input ports to a plurality of network output ports, each packet having a destination address specifying one of the output ports to which the packet is to be sent. The packet routing network includes an arbiter for transmitting only packets having distinct destination addresses, an assignor for assigning each packet a packet bit sequence comprised of an input port label and a destination address, a plurality of parallel Banyan routers, and a distributor/selector for selecting one of the Banyan routers and one of a limited set of active router input lines of the selected Banyan router such that the distributed packets will not collide with any other packets while being routed through the Banyan router. The present invention utilizes preprocessing instead of sorting to achieve nonblocking in Banyan routers. This eliminates the problem of the limit on the bit rate due to the requirement of stage-by-stage synchronization in the prior art Batcher-Banyan networks.

5 Claims, 10 Drawing Sheets

MODULATED NONBLOCKING PARALLEL BANYAN NETWORK

FIELD OF THE INVENTION

The present invention relates generally to telecommunication systems and more particularly to nonblocking packet routing networks.

BACKGROUND OF THE INVENTION

Optical fiber transmission systems have made possible high speed digital networks having data rates in excess of 1000 million bits per second (1000 Mbps). Many different kinds of communication systems based on fiber optic transmission have been implemented or proposed. One proposed system operates by sending messages called "packets" between users. Each packet includes a destination address which is used to route the packet through the various switches in a telephone system. This type of system is referred to as a packet switching network.

A modern optical fiber can easily transport signals at the rate of several gigabits per second, while the bit rates of present switches (even experimental switches) are lower by two orders of magnitude. In order to fully utilize the high data rates of modern optical fiber communications systems, it is necessary to significantly increase switching speeds.

The switches operate between input and output ports connected to the optical fibers. There may be hundreds of optical fibers connected to a single switch. To properly route a packet arriving on one of the input ports, the switch must read the address portion of the packet and then transfer the packet to the desired output port. The switching must be accomplished for each packet arriving on each optical fiber.

In general, the switch is constructed from a plurality of switching elements organized into stages. Each switching element has a set of inputs and a set of outputs. The inputs in the first stage are connected to the input optical fibers, and the outputs of the switching elements in the last stage are connected to the output optical fibers. The remaining switching elements are connected such that the inputs to a switching element in a given stage are connected to outputs of switching elements in the previous stage. Each packet is routed through the switch by setting the connections between the inputs and the outputs of the relevant switching elements.

Cross-connect switches may be divided into two broad classes. The first class includes cross-connect switches in which a single controller determines the routing of the packet through the cross-connect switch. This type of cross-connect switch has not been found to be practical for high-speed packet switching systems, since the controller must operate at unrealistically high speeds. The second type of cross-connect switch that has been proposed for packet-switching networks is a self-routing switch. In this type of switch, the switching elements in each stage examine a portion of the packet address and use this information for setting the connections between the input and output lines of the switching element.

One class of self-routing cross-connect switch is referred to as a Banyan network. Each of the switching elements consists of a 2×2 switching element having two inputs and two outputs. The switching element examines a predetermined bit of the packet address for each of the two packets received on its inputs. The bit in question is determined by the stage in which the switching element is located. The switching element then sets its internal connections according to the two address bits in question.

Banyan networks may suffer from two types of "blocking". A network is said to be blocking if two packets must be routed over the same connection between two switching elements. This will occur when the two packets input to a given switching element must be switched such that both packets leave the switching element on the same output thereof. This situation occurs if both packets have the same destination address. This situation is referred to as "output blocking". Output blocking cannot be avoided, since the two packets in question are destined for the same output of the cross-connect switch.

Output blocking can lead to the loss of the information being blocked. This result can be avoided if the cross-connect switch can detect two packets having the same destination address and buffer one of these in an input queue. A "reservation scheme" is used to choose which of the packets to send and guarantee that all destination addresses are distinct.

The second type of blocking is referred to as "internal blocking". This occurs when two packets with distinct destination addressed must traverse the same internal link in the cross-connect switch. In other words, the two packets have overlapping paths in the cross-connect switch. To overcome internal blocking within the Banyan network, a preprocessor is used to process the incoming packets. One form of preprocessing sorts the packets so that they start at different inputs from those that would cause blocking. In this way, the packets will follow different paths and, if sorted properly, can avoid internal blocking.

The most common sorting scheme suggested is the Batcher network. This sorting scheme suffers from several deficiencies. First, the Batcher network is more complex than the Banyan network which it controls. The number of switching elements in the Batcher network is greater than the number of element in the Banyan network. Second, the Batcher network must make comparisons between the destination addresses to perform the sort. A precise packet bit alignment must be maintained throughout the sorting network. This alignment requirement imposes constraints on the speed with which the Batcher network operates; hence it is difficult to construct a system that operates at a speed sufficient to fully realize the potential of the optical fiber system. The experimental implementation of the Batcher-Banyan network, for example, only achieves the rate of 139 Mbps for a 32×32 switch.

Broadly, it is an object of the present invention to provide an improved packet routing network switch.

It is a further object of the present invention to provide a switch having a nonblocking characteristic while operating at speeds commensurate with data rates of optical fiber networks.

These and other objects of the present invention will become apparent to those skilled in the art from the following detailed description of the invention and the accompanying drawings.

SUMMARY OF THE INVENTION

The present invention comprises a packet routing network for outputting information packets input on a plurality of network input ports thereto to a plurality of network output ports therefrom. Each of these packets has a binary k-bit destination address, wherein k is an even integer, represented by a bit sequence $(o_1, o_2, \ldots, o_k)$. The destination addresses specify the network output port to which each packet is to be routed. Each packet is input on one of the network input ports, the input ports each having a binary label represented by a bit sequence $(i_1, i_2, \ldots, i_k)$. The network comprises assigning means at the network input ports for assigning to each packet a packet bit sequence comprising the network input port label bit sequence and the destination address bit sequence The network also includes arbiter means coupled to the network input ports and having a plurality of arbiter output lines for transmitting only packets having distinct destination addresses over the arbiter output lines. The network also includes distribution means, coupled to the arbiter output lines, for distributing packets having distinct destination addresses responsive to the packet bit sequence. The network includes $2^m$ Banyan routers, wherein $m=(k/2)-1$, the Banyan routers being disposed in parallel with each other and having a plurality of router input lines and router output lines. The router input lines are coupled to the distribution means. The router output lines are coupled to the network output ports. Each of the Banyan routers has a distinct binary label taken in order from the sequence $\{0, 1, \ldots, (2^m-1)\}$. The Banyan routers have $2^{k-m}$ active router input lines given by all binary combinations of $(0 \ldots 0 i_m \ldots i_k)$, and $2^{k-m}$ active router output lines given by $x2^m+j$ wherein x is an integer with value $0 \leq x < (2^{k-m})$ and j is a label of one of said Banyan routers given by $j=(o_{k-m+1} \ldots o_k)$. The network operates such that the packets having a first bit of the destination address $(o_1)$ equal to 0 are routed by the distribution means to the router input lines having the labels $(0 \ldots i_m \ldots i_{k-1}0)$ and the packets having a first bit of the destination address equal to 1 are routed to the router input lines having the labels $(0 \ldots i_m \ldots i_{k-1}1)$.

Thus, in contrast with the prior art, the present invention preprocesses the packets instead of sorting them to achieve nonblocking in Banyan routers. This eliminates the problem of the limit on the bit rate due to the requirement of stage-by-stage synchronization in the prior art Batcher-Banyan networks.

The present invention provides a high speed alternative to the Batcher-Banyan network. It allows a higher data rate because it avoids the problem of stage-by-stage signal realignment in the Batcher sorter. Switching speeds to less than 1 nanosecond are possible.

Because the present invention guarantees nonblocking by a preprocessing technique, it can handle extremely wide variations of data bit rates, different kinds of communications such as voice, data and video, and different bandwidths and connection types. Further, because the present invention does not require significant new hardware, has minimal complexity, and operates very efficiently, it is economical to implement and to operate.

DETAILED DESCRIPTION OF THE INVENTION

The present invention utilizes a novel bit manipulation architecture to prevent internal blocking within a Banyan routing network. A description of the operation of Banyan routers is therefore necessary to fully describe the operation of the present invention.

A Banyan router routes packets from a plurality of input lines to a plurality of output lines such that any input line can be connected to any output line. Thus, for example, in a telephone system any caller connected to an input line can reach any destination connected to an output line.

Figure 1:
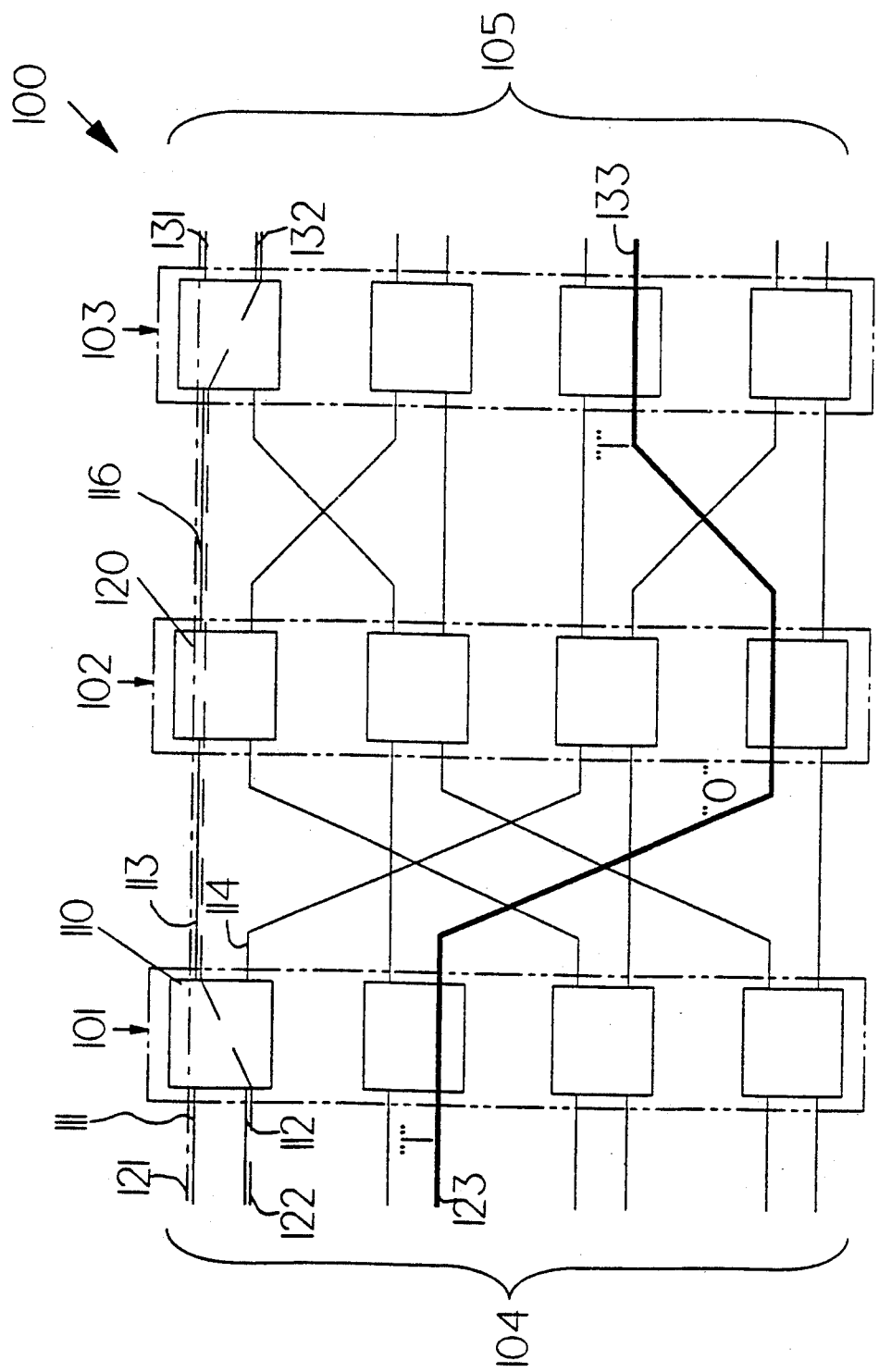
FIG. 1 is a schematic representation of an exemplary 8×8 Banyan router illustrating internal blocking according to the prior art.

An exemplary Banyan router having eight input lines and eight output lines (an 8×8 router) is shown in FIG. 1 at 100. The 8×8 Banyan router shown is presented for illustrative purposes only, as will be explained below. Banyan router 100 routes packets present on input lines 104 to output lines 105 based on a three-bit destination address included in each packet. Banyan router 100 comprises three stages 101-103. Each stage consists of four routing elements of which routing element 110 is typical.

Each routing element has two input lines and two output lines. For example, routing element 110 has input lines 111 and 112 and output lines 113 and 114. The manner in which the input lines and output lines are connected to each other in each routing element depends on one of the bits constituting the packet destination address. Each stage in Banyan router 100 operates on a different bit of the address. Therefore the number of destination address bits must equal the number of stages. In this example, stage 101 is controlled by the most significant bit, stage 102 by the second bit, and stage 103 by the least significant bit of the destination address. If the value of the bit is 0, the packet will be routed to the upper output line of the routing element (for instance, output line 113 of routing element 110). If the value of the bit is 1, the packet will be routed to the lower output line of the routing element (for instance, output line 114 of routing element 110). Thus, for example, a packet with a binary destination address of [101]

on line 123 will be routed from input line 123 to output line 133 following the heavy line shown in FIG. 1.

As noted above, Banyan networks suffer from blocking. Blocking is clearly undesirable, as it prevents desired communication of packets to their destinations. Hence some mechanism must be provided to prevent the blocked packets from being irretrievably lost. Proper design can reduce and even eliminate such blocking. Output blocking can be avoided by an "arbiter for output contention" to be described below. The present invention is directed to avoidance of internal blocking.

As a simple example of internal blocking, refer again to FIG. 1. Suppose that a packet on input line 121 has a desired destination at output line 131, and a packet on input line 122 has a desired destination at output line 132. As shown by the dashed line for the input line 121 packet and the dotted line for the input line 122 packet, there will be an internal block at the upper routing element output line 113 of routing element 110 of stage 101. Similarly, there will be another internal block at the upper routing element output line 116 of routing element 120 of stage 102.

In general, a routing element routes according to the $n^{th}$ bit of the destination address. There will be an internal block in an element in the $p^{th}$ stage if the destination addresses of the packets on both the upper and lower inputs of that routing element have the same $p^{th}$ bit of their destination addresses.

Banyan routers (also referred to as Banyan networks) have input and output labels at the respective input lines and output lines of each routing element of each stage. The output label of a routing element is transformed by an operation called a "shuffle exchange" to become the input label of the succeeding routing element. This operation will be described in detail below.

The input line label is binary coded. For example, for a k=3 router, the labels and addresses must each have three bits. Incoming lines 0, 1, 2, 3, 4, 5, 6, and 7 have binary line labels of 000, 001, 010, 011, 100, 101, 110, and 111 respectively. Each routing element in each stage of the router has input line labels and output line labels, each such label also having a length of k bits. As mentioned above, the packet destination address is also of k bit length.

The function of a Banyan router is implemented both by the internal switching of the routing elements and the interconnections of elements between different stages of the router. The connections and switching operations can be mathematically represented as operations on the sequence of bits representing the router input lines and the packet destination addresses. These operations determine the path a message takes through the router. Thus these operations comprise specific exchange transformations performed on the input-line-label/destination-address bit sequence (hereafter referred to as the bit sequence), which ultimately directs the packet to the desired destination address. Therefore these operations are central in any scheme for the assignment of messages to specific input lines which ensures that messages successfully reach their desired destination addresses without internal blocking.

Let the input lines label be given by $i_1 i_2 \ldots i_k$ and the packet destination address be given by $o_1 o_2 \ldots o_k$. Also, let the transformation $T_{p,q}$ exchange the $p^{th}$ and $q^{th}$ bits in the sequence $\{s_j\}_{j=1,k}$:

$$(s_1 s_2 \ldots s_k) T_{p,q} = (s_1 \ldots s_{p-1}, s_q, s_{p+1}, \ldots, s_{q-1}, s_p, s_{q+1}, \ldots, s_k) \quad (1)$$

As stated above, an N×N Banyan router's operation can be described as a series of transformations acting on a bit sequence producing a new bit sequence. This operation is known as a "shuffle exchange". The transformations are performed automatically by the specific connections in a shuffle exchange. There are essentially two types of transformations. A transformation occurring in an individual routing element is called a "local shuffle". A transformation occurring in the connection between routing elements in two different stages is known as a "perfect shuffle." These types of automatic shuffle exchanges are known in the telecommunications arts.

The final result is that at the end of the three stages, the destination address is the same as that at the beginning assuring that the packet will reach the desired destination.

This process can best be understood through an example. For an 8×8 Banyan router, the above transformations reduce in symbolic form to:

$$(i_1 i_2 i_3 o_1 o_2 i_3) T_{3,4} T_{1,3} T_{3,5} T_{2,3} T_{3,6} = (o_1 o_2 o_3 i_3 i_1 i_2) \quad (2)$$

The $T_{3,4}$, $T_{3,5}$ and $T_{3,6}$ operations represent the "local shuffle" action of the routing elements. The $T_{1,3}$ and $T_{2,3}$ operations represent the interconnections between the three stages, performing a "perfect shuffle".

Figure 2:
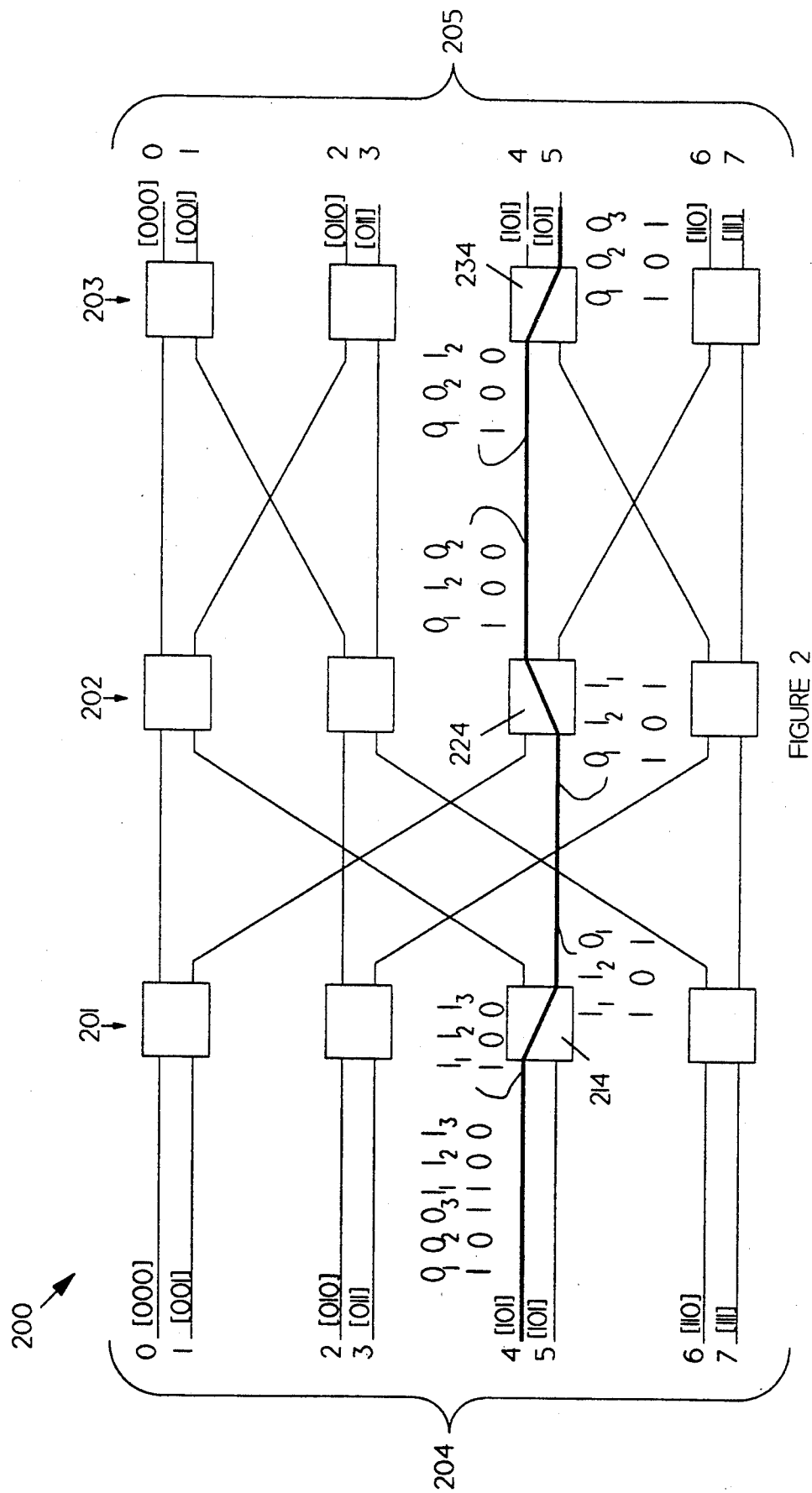
FIG. 2 is a schematic representation of an exemplary 8×8 Banyan router illustrating an example of routing a packet having an input-port/destination-address bit sequence according to the present invention.

FIG. 2 illustrates the k=3 case for an 8×8 Banyan router 200. Input lines 204 have input line numbers from 0 to 7 represented by binary input line labels [000] to [111] with input line 4 (binary address [100]) carrying a packet having a destination address [101] which corresponds to output line number 5 as shown at output lines 205. The initial input line label is thus [100] and the destination address is [101]. For this example, the packet bit sequence assigned this packet is [100101]. At the entrance to the first stage 201, the bit sequence is not transformed and the input line label remains as [100] as shown. As described above, routing element 214 acts on the most significant bit of the destination address (here [1]) and directs the packet to the [1] output line of routing element 214. The transformation $T_{3,4}$ exchanges the third and fourth bits of the bit sequence to produce the first stage output line label $i_1 i_2 o_1$ which, upon transformation by the next operator $T_{1,3}$, becomes $o_1 i_2 i_1$, forming the second stage input label. Routing element 224 of second stage 202 routes the packet to the upper [0] output and $T_{3,5}$ transforms the bit sequence to produce output line label $o_1 i_2 o_2$ which is then transformed by $T_{2,3}$ to produce third stage input line label $o_1 o_2 i_2$. Finally, third stage 203 routing element 234 directs the packet to the lower [1] output and the bit sequence is transformed to produce $o_1 o_2 o_3$.

If there are N incoming packets, each having a distinct destination address, to be directed through an N×N Banyan router, then the packets will be non-blocking if and only if every pair of output lines of the same routing element has a distinct output line label in each stage. This is evident from the definition of blocking given above, because the term "blocking" was defined as two or more incoming packets being directed to the same routing element output line, thereby resulting in a collision in that output line. Output blocking will not occur because two or more incoming packets will not have the same destination address. Internal blocking will not occur because two or more incoming packets will not require the same output line at any of the stages.

The present invention ensures nonblocking by utilizing a parallel Banyan network and directing incoming packets having distinct destination addresses to specific Banyan routers. By the choice of Banyan router according to the present invention, the packets will not experience internal blocking because of the inherent functionality of Banyan routers. It can be shown for the present invention that the output line labels are distinct in each stage. Thus for N incoming packets having distinct destination addresses, the Banyan router of the present invention is internally nonblocking.

In the present invention N is chosen such that $N=2^k$, where k is an even number. Since k is even, then $t=k/2$ must be an integer.

Broadly, the present invention operates as follows: In each round of switching, the switch attempts to route the head-of-line packet at every input buffer to its destination output. The present invention's Modulated Nonblocking Parallel Banyan Network (MNPBN) routes packets from input ports to output ports. Packets having distinct destinations are switched through the self-routing interconnection network to their respective destination outputs without blocking. If there are multiple packets having the same destination address, only one packet is selected for routing and the others are stored in a buffer for re-attempt in the next round.

Figure 3:
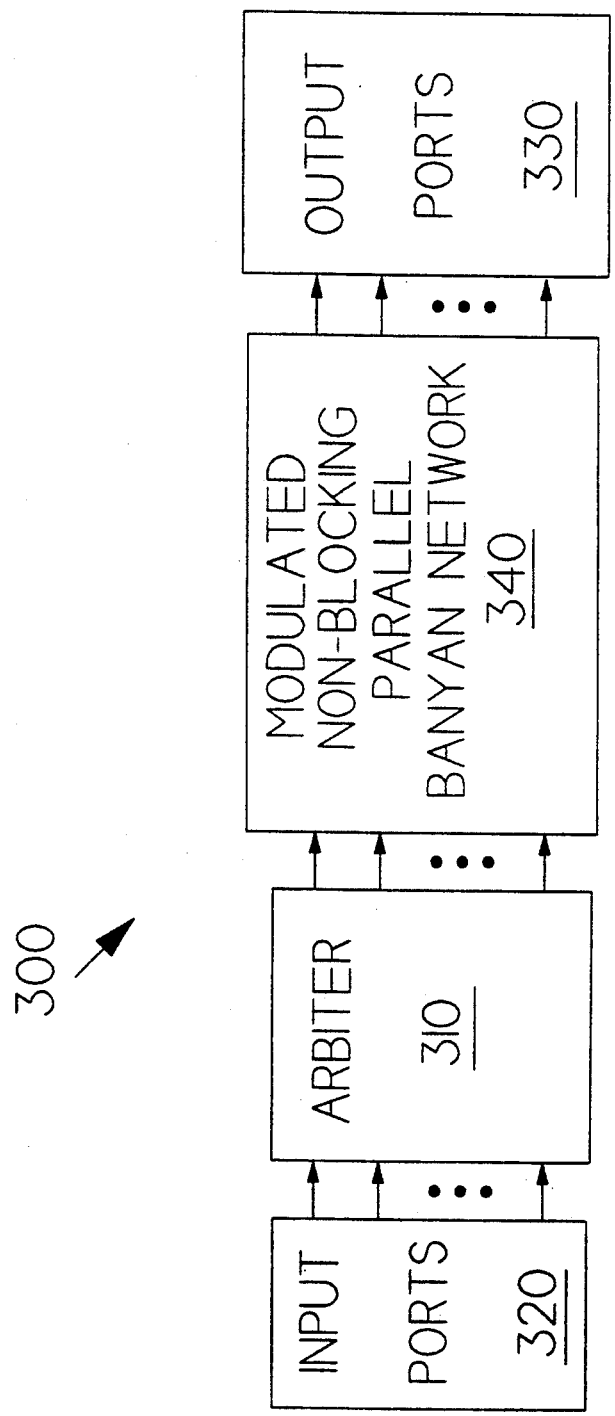
FIG. 3 is an illustration of the schematic placement of the Modulated Nonblocking Parallel Banyan Network according to the present invention.

FIG. 3 schematically describes an embodiment of the present invention comprising a switch 300 including input ports 320 coupled to an arbiter for output contention 310 and a Modulated Nonblocking Parallel Banyan Network (MNPBN) 340 disposed between input ports 320 and output ports 330 and coupled to arbiter 310. Arbiter 310 can be any system utilizing a method or arrangement for arbitration of output contention for packets having identical destination addresses. One example is a token ring arbiter to be described below. MNPBN 340 routes packets from input ports 320 to the desired output port of output ports 330 without blocking as will be described in more detail below.

Figure 4:
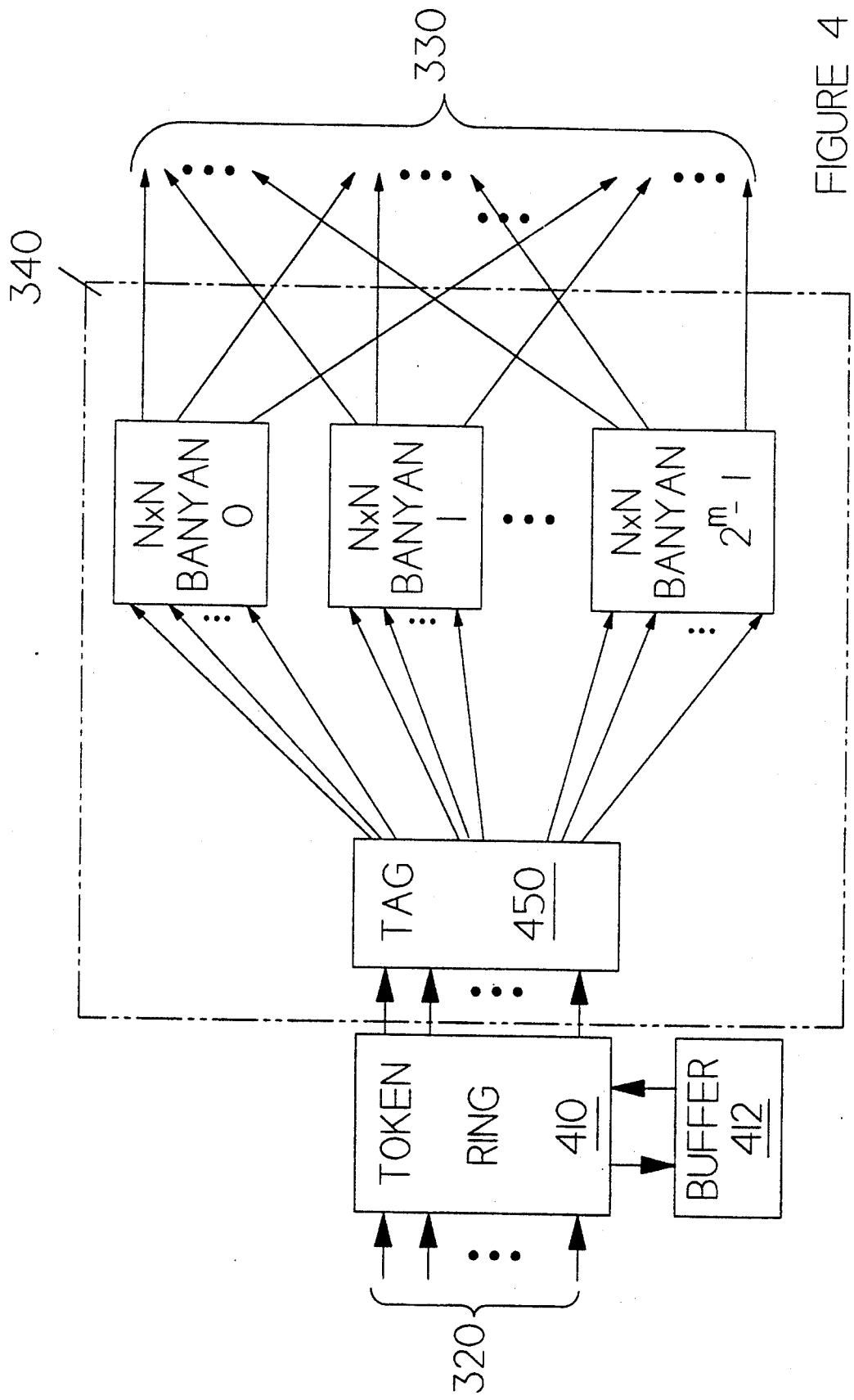
FIG. 4 is a schematic illustration of the preferred embodiment of the present invention showing the token ring arbiter, the tag, and the parallel Banyan routers.

FIG. 4 illustrates the preferred embodiment of the present invention in more detail. Input ports 320 are coupled to a token ring arbiter 410 which is coupled to a tag device 450 which in turn is coupled to a plurality of parallel Banyan network routers 460 which are coupled to output ports 330. Tag device 450 and the parallel Banyan routers 460 comprise the MNPBN 340. There are $N=2^k$ input lines included in input ports 320, where k is an even integer and also represents the number of bits in the packet destination address and the number of stages in the Banyan routers 460. Token ring arbiter 410 also has N output lines coupled to tag 450 which itself also has N output lines coupled to Banyan routers 460. There are $2^m$ routers 460 which are each N×N and are labeled from 0 to $2^m-1$ where $m=[(k/2)-1]$, an equivalent expression to that given above. There are also N output lines in output ports 330.

In operation, token ring arbiter 410 has stations on a ring-shared bus, which stations are in a one-to-one correspondence with inputs ports 320. Token ring arbiter 410 operates such that tokens with distinct labels move around the bus, each token representing the right to route a packet to the output port 330 matching its label. A station fetches the proper token for the head-of-line packet at its corresponding input port when the token passes by the station. If the token is already taken, the packet is stored in a buffer 412 for re-attempt later.

Token ring arbiter 410 transmits packets having distinct destination addresses to tag 450. Tag device 450, in one embodiment of the present invention, performs an identification check of the destination address and distributes the packet to one of the parallel Banyan routers 460 based on the last m bits of the destination address.

According to the present invention, in a system with an even number of k stages (and k bits in the destination address), when each incoming packet with the destination address $o_1 \ldots o_k$ arrives, tag device 450 scans the m least significant bits of the destination address $o_{k-m+1} \ldots o_k$. Tag device 450 then selects the one of Banyan routers 460 having a label equal to the number represented by the m bits given above. For example, for a k=4 system, tag device 450 chooses the Banyan router 460 with label equal to $o_4$; for k=6, $o_5 o_6$, and so on. Tag device 450 then transmits this packet to the selected one of Banyan routers 460.

In each of Banyan routers 460, only the $2^{k-m}$ input lines with the labels forming all combinations of $0 \ldots 0$ $i_m \ldots i_k$ can receive the incoming packet. That is, given k (and $m=[(k/2)-1]$), all possible combinations of $i_m$ to $i_k$ give the input line labels which will be active in the Banyan router. For example, for k=4, there are $2^m=2$ Banyan routers each of which has 16 ($N=2^4$) input lines. The active input lines are given by the combination $0 i_1 i_2 i_3$, giving the input lines labeled [0000], [0001], [0010], [0011], [0100], [0101], [0110] and [0111].

If the first bit of the destination address ($o_1$) is equal to 0, then the packet is routed to Banyan router input lines labeled $0 \ldots i_m \ldots i_{k-1} 0$ and the packets having a first bit of the destination address equal to 1 are routed to Banyan router input lines having the labels $0 \ldots i_m \ldots i_{k-1} 1$.

In the k=4 example, packets with destination addresses having the first bit equal to 0 are routed to Banyan router input lines labeled [0000], [0010], [0100], and [0110]. Packets with destination addresses having the first bit equal to 1 are routed to Banyan router input lines labeled [0001], [0011], [0101], and [0111].

Of the $2^{k-m}$ (=8) active input lines to the selected Banyan router, after the determination of the set of Banyan router input lines from the first bit of the destination address, the specific line is chosen sequentially starting from the top Banyan router input line to the bottom Banyan router input line. The sequential selection is also performed by tag device 450.

One embodiment of the functions of tag device 450 may be described with reference to FIGS. 5 and 6.

Figure 5:
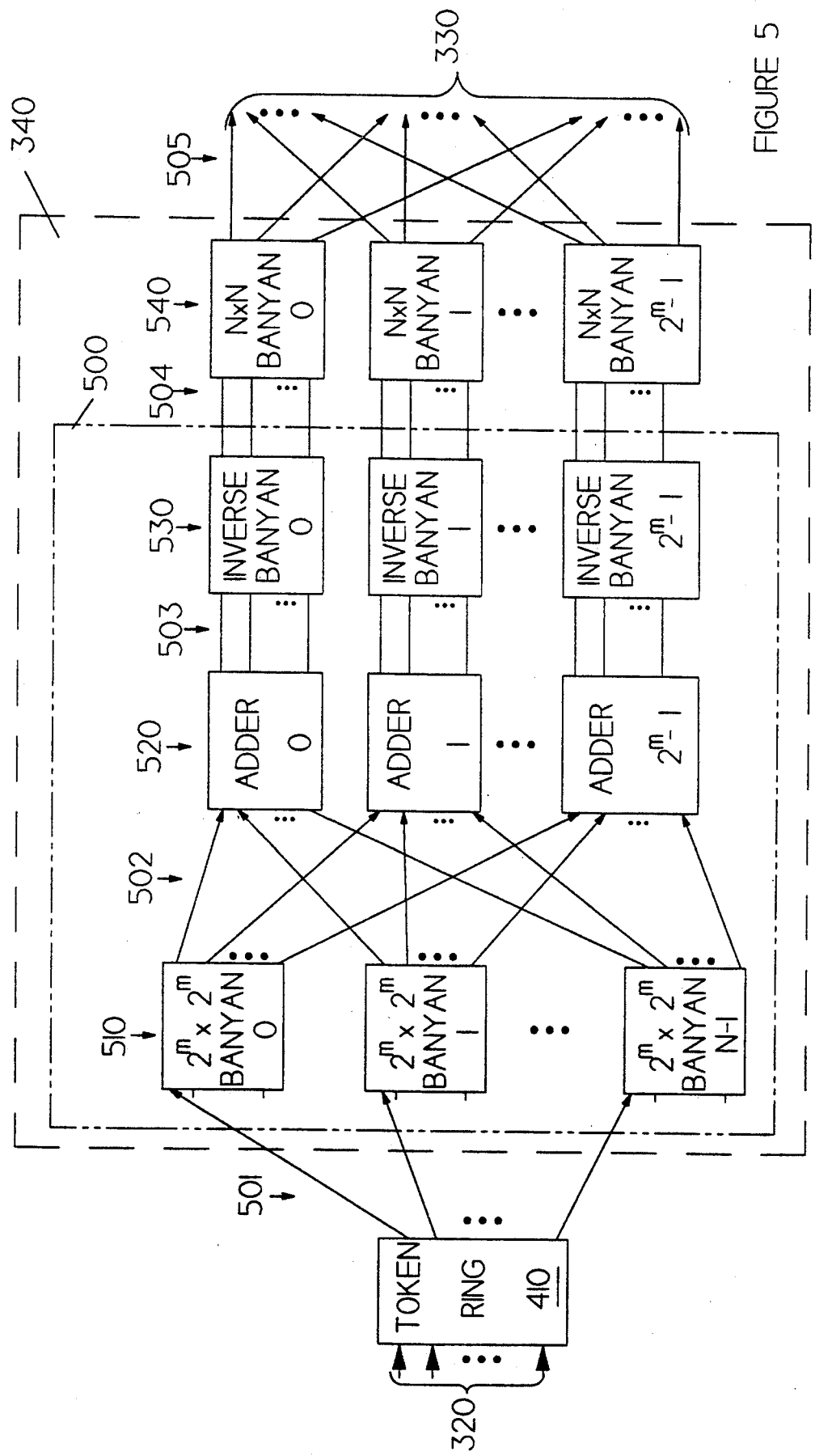
FIG. 5 is a schematic illustration of an embodiment of a switching network according to the present invention.

FIG. 5 is a block diagram showing a general N×N tag device 500 as part of MNPBN 340. Input ports 320 carry packets to token ring arbiter 410 which sends packets with distinct destination addresses over N input lines 501 to tag 500. Input lines 501 connect to N $2^m \times 2^m$ mini Banyan routers 510. Mini Banyan routers 510 are labeled from 0 to N−1 to correspond to the input lines 501. Mini Banyan routers 510 route the packets according to the m least significant bits of the destination address $o_{k-m+1} \ldots o_k$ as described above. That is, each stage of each mini Banyan router 510 routes according to one of the bits of the last m bits of the destination address as described previously for Banyan routers in general.

The $2^m$ output lines of each mini Banyan router 510 connect to N input lines 502 of running sum adders 520. Running sum adders 520 determine the packet output position for each of the N input lines 503 to $2^m$ inverse Banyan routers 530. The packet output position is determined simply in a top-down fashion beginning with "0" for a line with a packet and sequentially thereafter for active lines. Running sum adders 520 are reset for each scan. This output position constitutes a temporary address for each input line to inverse Banyan routers 530. The temporary address is inserted in the header bits of the packet in a space reserved for that purpose.

Inverse Banyan routers 530 "compress" the N input lines to become $2^{k-m}$ active output lines grouped at the top half of the output ports of inverse Banyan routers 530. How this is achieved is described below.

Recall that each stage of a Banyan router operates on one of the bits of the packet destination address and that each stage consists a plurality of routing elements, the number of which depends on the number of input and output lines of the Banyan router. An inverse Banyan router is the inverse of a regular Banyan router in that the regular Banyan router is turned around such that the connections between stages in the front half are now in the back half and vice-versa.

Figure 6:
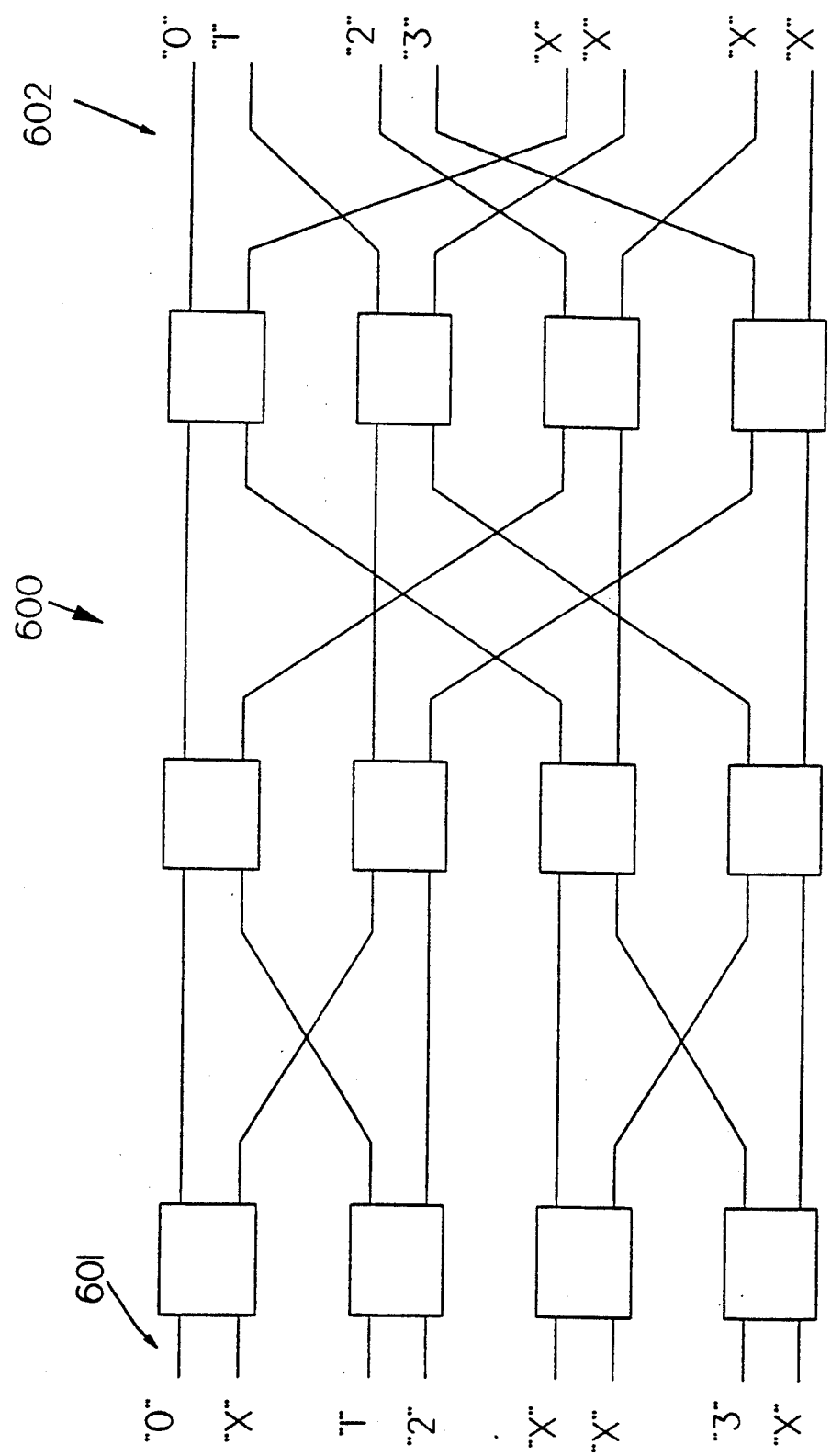
FIG. 6 shows an exemplary 16×16 inverse Banyan router 600 according to the prior art.

FIG. 6 shows an exemplary 8×8 inverse Banyan router 600. The temporary addresses were assigned by running sum adders 520 (of FIG. 5) as a monotonically increasing sequence with a number for active lines only. Exemplary temporary addresses 0 to 7 are shown adjacent to input lines 601 with an "X" denoting an idle line. Inverse Banyan router 600 routes the packets using the bits of the temporary address as the routing bits. It may be shown that an inverse Banyan router 600 routes the packets to output lines 602 such that all the packets appear on adjacent lines ordered by the temporary address (as shown by the addresses 0 to 7 adjacent to output lines 602). The idle input lines 601 will be connected to the remaining output lines of 602.

Returning to FIG. 5, the active output lines of inverse Banyan routers 530 are connected to $2^m$ Banyan routers 540 via lines 504 for each inverse Banyan router. Banyan routers 540 are connected to N output ports 330 via lines 505 for each Banyan router.

In another embodiment of the present invention, the destination address check, choice of Banyan router, and selection of Banyan router input line described above are performed by a software routine. In such a routine, tag first scans the least significant m bits of the packet's destination address, $o_{k-m+1} \ldots o_k$. Tag then selects the Banyan router with the address label equal to the binary number represented by those m bits. Tag then sends the packet to the chosen Banyan router on the active lines chosen sequentially from top to bottom. This can be performed in the manner of a running sum adder. One routine to implement the functions just described is called "TAG" and was developed by Fujitsu and described in Kato, Y. et al., "Experimental Broadband ATM Switching System," Fujitsu Laboratories Ltd., Kawasaki, Japan, 1989. TAG is available from Fujitsu and known to those skilled in the telecommunications arts.

Referring again to FIG. 4, after routing through the chosen Banyan router according to the destination address in the manner described previously, the packet is output on a limited number of router output lines. In the specific Banyan router with the label j (where $j = o_{k-m+1} \ldots o_k$, the binary representation), because there are only $2^{k-m}$ input lines having packets possible, there are only $2^{k-m}$ output lines possibly having packets. Those $2^{k-m}$ output lines having the labels $x2^m + j$ (where $0 \leq x < 2^{k-m}$) can have an outgoing packet. In other words, as long as there is no output contention, the $x^{th}$ output line of the $j^{th}$ Banyan router links directly to the output port having the label $x2^m + j$. As in the input line case, only those active output lines are connected to tag 450 and the inactive lines are left as open ports.

Figure 7:
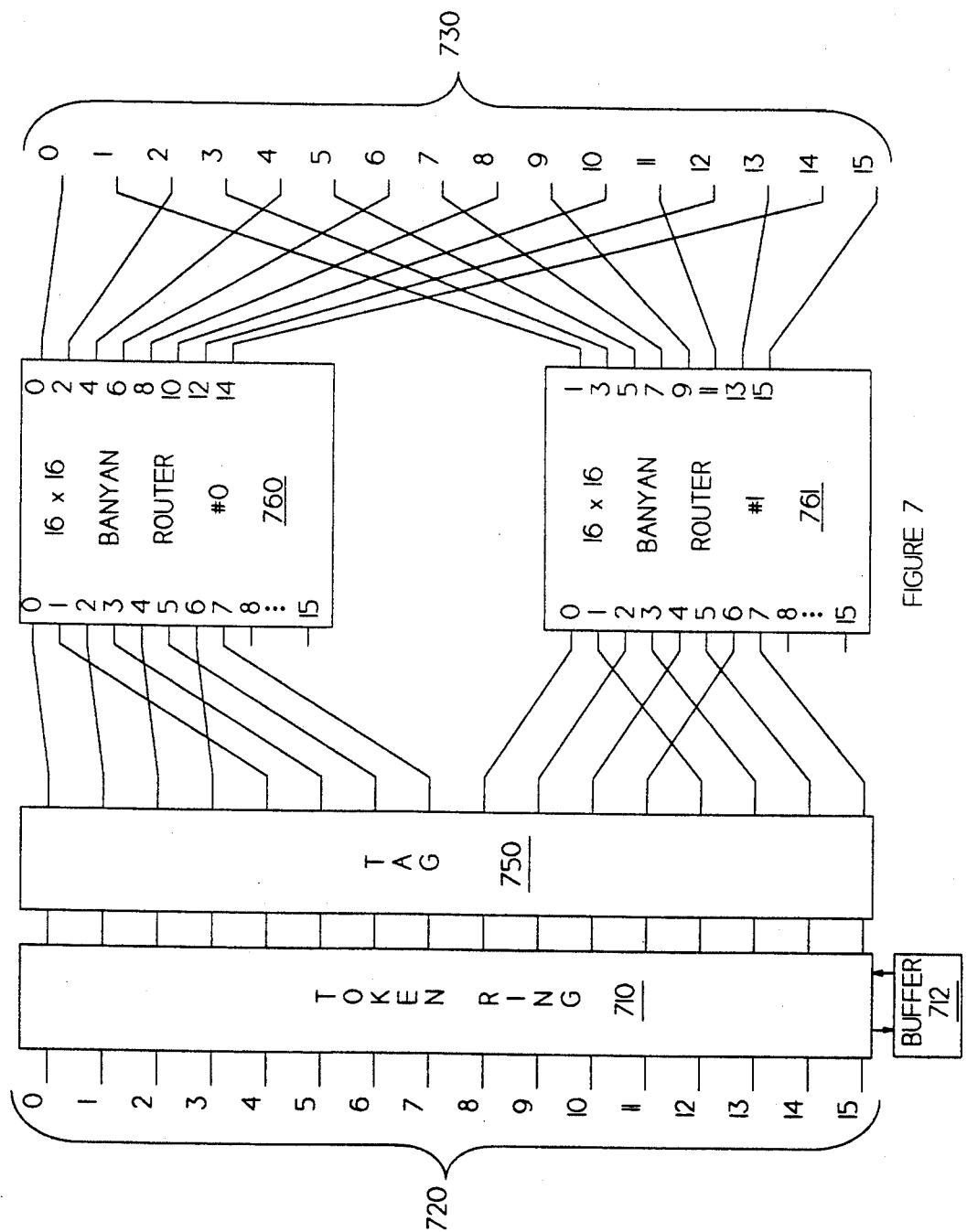
FIG. 7 is an example of an embodiment of the Modulated Non-Blocking Parallel Banyan Network of k=4 according to the present invention.

An example of the MNPBN is presented for k=4 as shown in FIG. 7. Incoming packets arrive at input ports 720. Token ring arbiter 710 sends only packets with distinct destination addresses to tag device 750. Only the upper half of router input lines for both parallel Banyan routers are connected to tag device 750 because the active router input lines are given by all binary combinations of $0 \ldots 0 i_m \ldots i_k$, so only those input lines labels beginning with a 0 are active. The router output lines are connected to the output ports 730 according to the formula $x2^m + j$, where x is a sequence of integers given by $0 \leq x < 2^{k-m}$, m is the integer part of $(k-1)/2$, and j is the label number of the parallel Banyan router (here either 0 or 1). Thus for the j=0 Banyan router 760, the output lines 0, 2, 4, 6, 8, 10, 12, and 14 of router output lines 705 are connected to output ports 730 with the corresponding numbers. For the j=1 Banyan router 761, the output lines 1, 3, 5, 7, 9, 11, 13, and 15 of router output lines 705 are connected to the output ports 730 with the corresponding numbers. The inactive Banyan router output lines are left as open ports.

Suppose an incoming packet on input port #2 ($i_1 i_2 i_3 i_4 = [0010]$) has a distinct destination address given by $o_1 o_2 o_3 o_4 = [1010]$. From the definitions given above, m = integer$[(k-1)/2] = 1$ and $N = 2^k = 16$. Tag device 750 sends the packet to the router with the label $j = o_{k-m+1} \ldots o_k = o_4 = 0$. That is, of the Banyan routers 460 (of FIG. 4), router #0 (760) receives the packet as distributed by tag device 750. In each Banyan router, only eight ($2^{k-m} = 8$) of the sixteen input lines can receive packets (that is, are active). These eight input lines are labeled [0000], [0001], [0010], [0011], [0100], [0101], [0110], and [0111] and correspond to router input lines 0, 1, 2, 3, 4, 5, 6, and 7. Since the first bit of the destination address ($o_1$) is 1, the possible router input lines are [0001], [0011], [0101], and [0111]. The specific input line to Banyan router #760 is chosen sequentially among the four active possible lines for a destination address with that first bit starting from the top by tag device 750. In router #0, since only eight of the sixteen input lines can receive packets, there are also only eight output lines from router #0 possibly having packets. These eight output lines have the labels = $x2^m + j$ (where $0 \leq x < 2^{k-m}$). For this example, the possible labels are: $x(2) + 0$, where x can have the values 0, 1, 2, 3, 4, 5, 6, and 7. This gives the labels of the output lines of router #0 corresponding to the output ports 0, 2, 4, 6, 8, 10, 12, and 14. In this example, the destination address is [1010] = 10, so the packet will be sent to output port 10.

The example provided above illustrates a 16×16 Banyan routing network according to the present invention. In general, if k is the number of stages in the Banyan router, then an N×N (where $N = 2^k$ = number of input lines) Banyan router has $2^{k-1}$ routing elements in which the $p^{th}$ stage routes packets according to the $p^{th}$ bit of the packet destination address.

Figure 8:
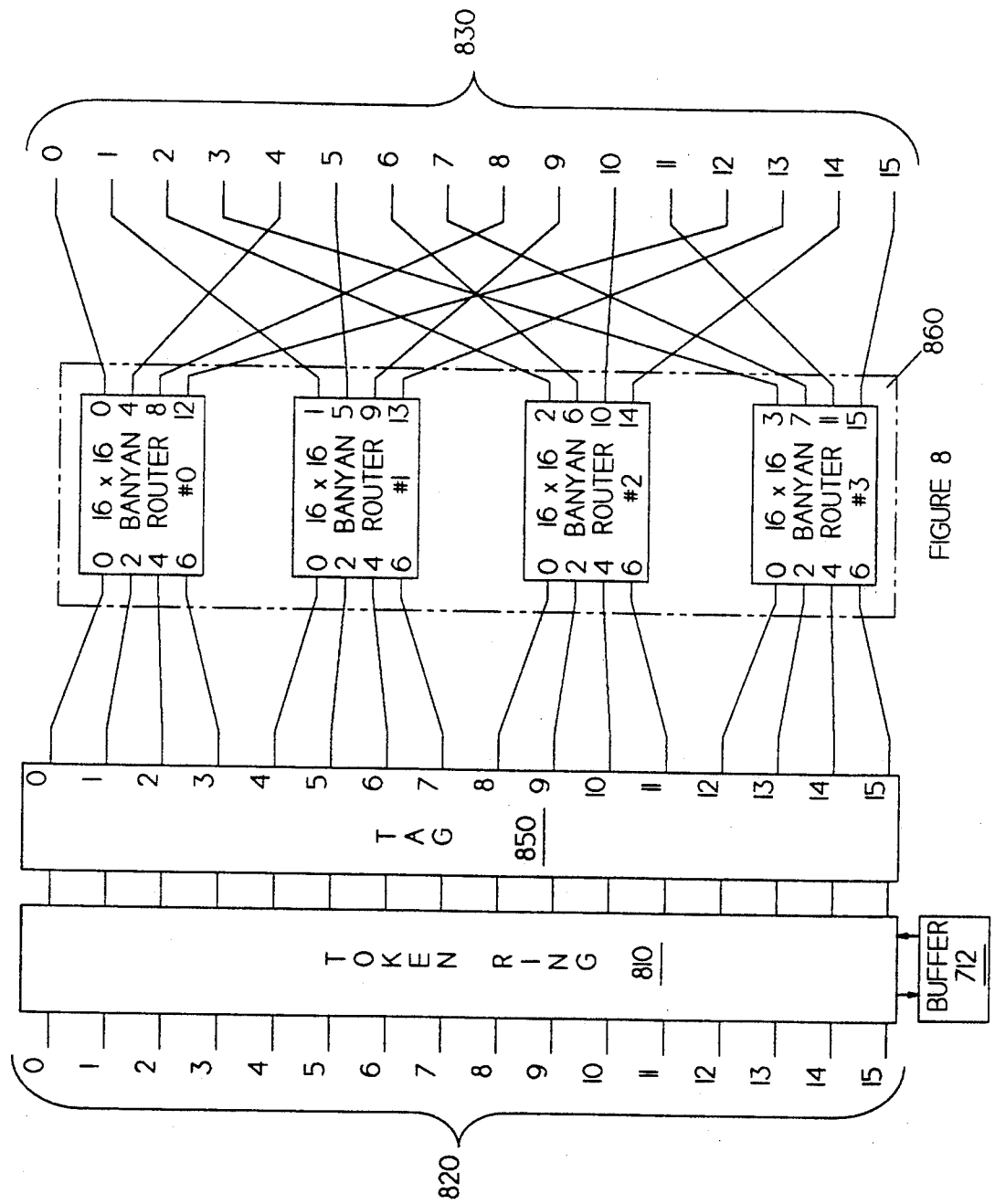
FIG. 8 illustrates a 16 by 16 Distributed Nonblocking Banyan Network according to the predecessor of the present invention.

The present invention represents a significant improvement over its predecessor, the Distributed Nonblocking Parallel Banyan Network (DNPBN). An example of a DNPBN is disclosed in copending application U.S. Ser. No. 07/518,208, U.S. Pat. No. 5,132,965. FIG. 7 discussed above illustrates a 16×16 MNPBN according to the present invention, and FIG. 8 illustrates a 16×16 DNPBN. A comparison of these Figures reveals the distinctions between the DNPBN and the present invention. As explained below, the present invention requires far fewer switching elements for a given number of input and output lines, thereby decreasing manufacturing complexities and cost.

FIG. 8 illustrates a typical 16×16 DNPBN. A token ring arbiter 810 is connected to a tag device 850 by means of sixteen tag device input lines 852. Tag device output lines 854 are connected to four 16×16 Banyan routers 860 in the following manner. Tag device output lines 854 are divided into four sets of four lines, with the first set routed to the #0 Banyan Router 860, the second set to the #1 Banyan Router 860, the third set to the #2 Banyan Router 860, and the fourth set to the #3 Banyan Router 860. For each set, the four lines are routed to the first four even numbered input lines of the appropriate Banyan Router 860. The first, fifth, ninth and thirteenth output lines (numbered 0, 4, 8, and 12) of the four Banyan Routers 460 become the DNPBN output lines 830. The first four output lines correspond to the first output line of each Banyan Router 860 in sequence, the second four output lines correspond to the second output line of each Banyan Router 860 in sequence, and so forth.

Figure 9:
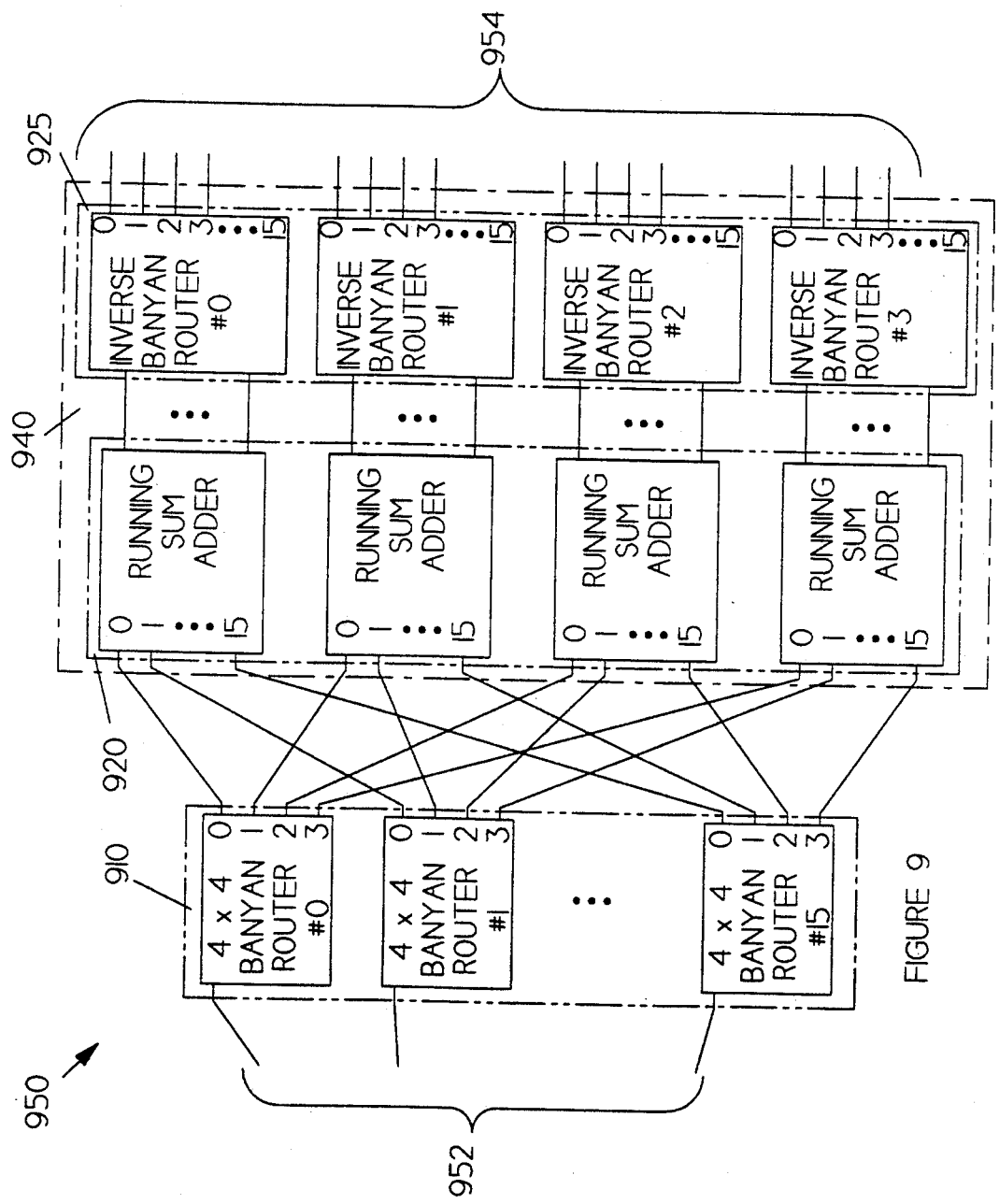
FIG. 9 illustrates an embodiment of the Tag device 850 of the 16 by 16 Modulated Non-Blocking Banyan Network of FIG. 8.
Figure 10:
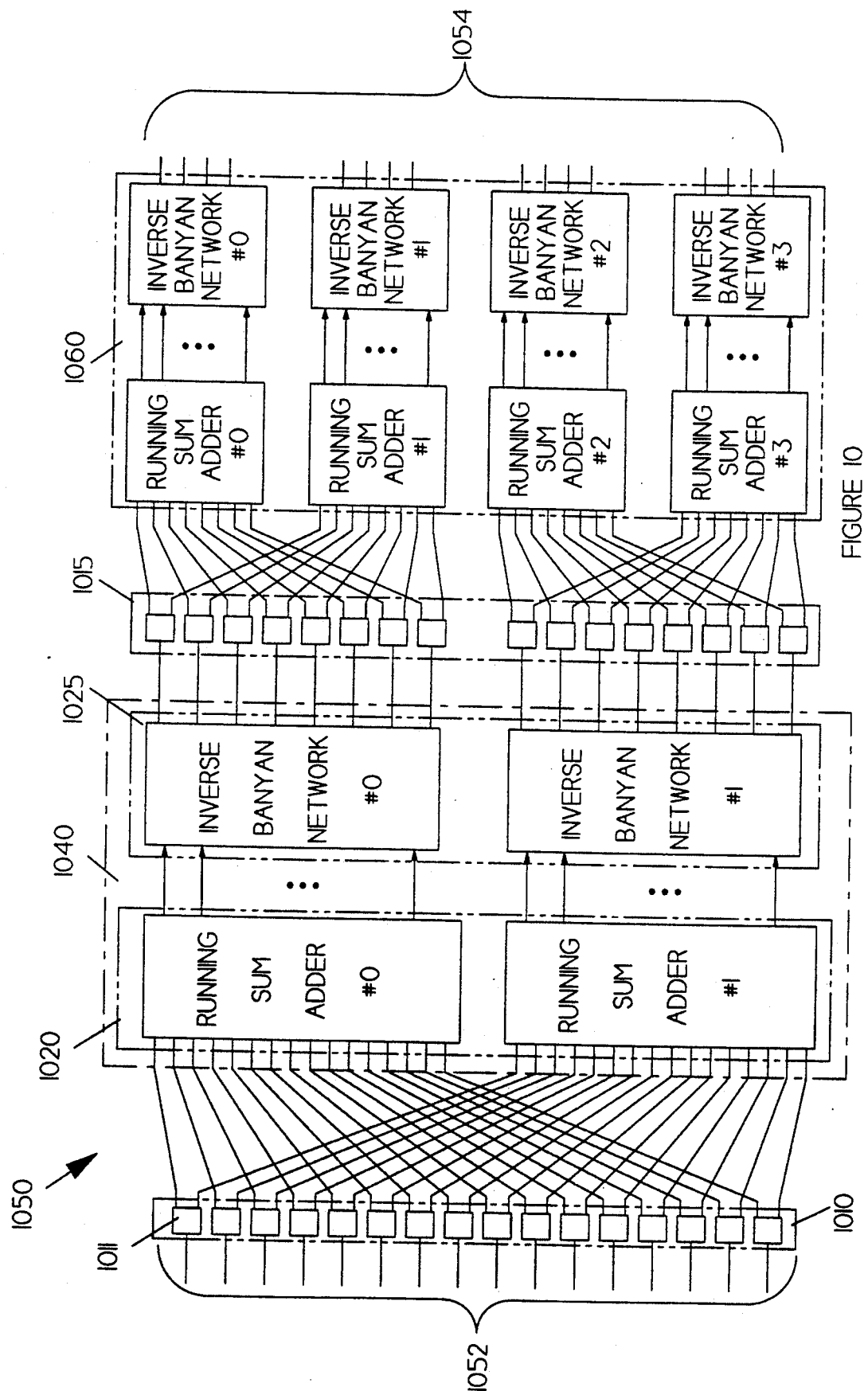
FIG. 10 illustrates an embodiment of the Tag device 750 of the 16 by 16 Modulated Non-Blocking Banyan Network of FIG. 7.

Hence a comparison between FIGS. 7 and 8 indicate that the DNPBN and MNPBN differ in the following ways: The MNPBN has half as many 16×16 Banyan Routers and the specific connections of the 16×16 Banyan Routers to the Tag devices 750 and 850 and the output lines 730 and 830 are slightly different. What is not shown in these Figures is that these differences are they result in a difference in the construction of the Tag devices. Therefore FIGS. 9 and 10 illustrate the Tag devices of the DNPBN and MNPBN of the present invention, respectively. A comparison of these devices illustrates the manner in which the efficiencies of the present invention are achieved.

In FIG. 9, each tag device input line 952 is connected to an input of an individual one of the sixteen 4×4 Banyan routers 910. Each of these Banyan routing elements 910 have four outputs, each output being connected to one of the four running sum adders 920. The running sum adders 920 assign a temporary address to each of the inputs. Each of the running sum adders 920 has an associated inverse Banyan router 925 which routes the signals from the running sum adders 920 based upon these temporary addresses, in a manner analogous to that discussed above for the MNPBN. The sixteen output lines made up of the first four output lines of the four inverse Banyan routers 925 become the tag device output lines 954.

In FIG. 10, tag device 1050 has sixteen tag device input lines 1052. These are each attached to an individual one of sixteen 1×2 Banyan routers 1010. An exemplary 1×2 Banyan router is shown at 1011. One of the two outputs of each Banyan router 1010 is connected to an input line of one of the two running sum adders 1020; the remaining outputs of Banyan routers 1010 are attached to the other running sum adder 1020. The running sum adders 1020 assign a temporary address to each input packet. Each running sum adder 1020 has an associated inverse Banyan router 1025, which routes the packets according to the temporary address, as described above. These running sum adders 1020 and associated inverse Banyan routers 1025 comprise a sorting stage 1040. The eight output lines from each of the two inverse Banyan routers 1025 of sorting stage 1040 are connected to a different one of the sixteen 1×2 Banyan routers 1015. Banyan routers 1015 route the packets to a second sorting stage 1050 of four running sum adders and four associated inverse Banyan routers. The sixteen output lines chosen from the first four output lines of all four inverse Banyan routers of the second sorting stage 1060 to become the tag device output lines 1054, in the following manner. Among the first two inverse Banyan routers, the output lines chosen are alternated between the inverse Banyan routers, in order. Then the same procedure is followed for the second pair of inverse Banyan routers.

From the above description it is obvious that the tag device according to the present invention offers significant advantages in diminished complexity of the total circuit over that of the DNPBN. The number of switching elements for an N×N Banyan network, where $N=2^k$, is $k2^{k-1}$. A DNPBN requires $2^{k/2}$ N×N Banyan routers 815 for cases where k is even. Hence the reduction of the number of N×N Banyan networks by one half, as stated above, yields a significant reduction in the number of routing elements required in the final stage. The increase in the complexity of the tag device is relatively minor for cases where k is greater than 2, as the additional Banyan networks are of much smaller size than the N×N routers of the final stage.

It is also important to note that the MNPBN of the present invention requires that k be even. DNPBN systems allow k to be odd. By imposing this restriction, the tag device may be modified as shown herein to yield significant advantages over the DNPBN.

In summary, the present invention provides a packet routing network switch having switching speeds commensurate with data rates of optical fiber networks and which guarantees nonblocking packet routing.

While the above description was made with respect to communication systems, it is understood to those skilled in the art that the present invention is applicable to other fields utilizing the transmission of electronic signals, for example computers and electronic instruments of all kinds. Accordingly, while the above description provides a full and complete description of the preferred embodiments of the present invention, various modifications, alternate constructions and equivalents may be employed. Therefore, the above description and illustrations should not be construed as limiting the scope of the invention which is defined by the following claims.

What is claimed is:

1. A packet routing network for outputting information packets input on a plurality of network input ports thereto to a plurality of network output ports therefrom, each packet having a destination address comprising a k-bit address word specifying the identity of the output port to which said packet is to be switched, wherein k is an even integer and each output port is represented by a output port label bit sequence $(o_1, o_2, \ldots, o_k)$, each packet being input on one of said network input ports having a binary label represented by an input port label bit sequence $(i_1, i_2, \ldots, i_k)$, said packet routing network comprising:

arbiter means coupled to said network input ports and having a plurality of arbiter output lines for transmitting over said arbiter output lines only packets having distinct ones of said address words;

$2^m$ Banyan routers, wherein $m = (k/2) - 1$, k being an even integer, said Banyan routers being disposed in parallel with each other and having a plurality of router input lines and router output lines, said router output lines coupled to said network output ports, each of said Banyan routers having a distinct binary label taken in order from the sequence $\{0,1, \ldots, (2^m-1)\}$, and $2^{k-m}$ active router input lines given by all combinations of $(0 \ldots 0 i_m \ldots i_k)$, and $2^{k-m}$ active router output lines given by $x2^m+j$ wherein x is an integer with value $0 \leq x < (2^{k-m})$ and j is a label of one of said Banyan routers given by $j = (o_{k-m+1} \ldots o_k)$;

distribution means, coupled between said arbiter output lines and said router input lines, for distributing packets transmitted by said arbiter means to one of said Banyan routers, wherein the packets having a first bit of their corresponding destination address words ($o_1$) equal to 0 are routed by said distribution means to said router input lines having the labels $(0 \ldots i_m \ldots i_{k-1}0)$ and the packets having a first bit of their corresponding destination address word equal to 1 are routed to said router input lines having the labels $(0 \ldots i_m \ldots i_{k-1}1)$.

2. The packet routing network of claim 1 wherein said arbiter means comprises a token ring arbiter for transmitting only packets having distinct destination address words and storing packets not having distinct destination address words in a buffer for re-attempt at a later time.

3. The packet routing network of claim 1 wherein said distribution means comprise means for receiving from said arbiter means a packet having one of said destination address words, selecting the Banyan router whose label $(O_{k-m+1} \ldots O_k)$ corresponds to the final m bits of said one of said destination address words, and transmitting that packet to one of said selected Banyan routers via one of said active router input lines.

4. The packet routing network of claim 1 wherein said active router input lines are chosen sequentially after selection of the router input lines determined by the first bit of said destination address words.

5. A packet routing network for outputting information packets input on a plurality of network input ports thereto to a plurality of network output ports therefrom, each packet having a destination address comprising a k-bit address word specifying the identity of the output line to which said packet is to be switched, wherein k is an even integer, represented by a bit sequence $(o_1, o_2, \ldots, o_k)$ and specifying one of said network output ports to which each packet is to be routed, and each packet being input on one of said network input ports having binary labels represented by a bit sequence $(i_1, i_2, \ldots, i_k)$, said packet routing network comprising:

arbiter means coupled to said network input ports and having a plurality of arbiter output lines, for transmitting over said arbiter output lines only packets having distinct destination address words, said arbiter means including a token ring arbiter for transmitting only packets having distinct destination address words and storing packets not having distinct destination addresses in a buffer for re-attempt at a later time;

$2^m$ Banyan routers, wherein $m = (k/2) - 1$, k being an even integer, said Banyan routers being disposed in parallel with each other and having a plurality of router input lines and router output lines, said router output lines coupled to said network output ports, each of said Banyan routers having a distinct binary label taken in order from the sequence $\{0 \ldots (2^m-1)\}$ and $2^{k-m}$ active router input lines given by all combinations of $(0 \ldots 0 i_m \ldots i_k)$; and distribution means, coupled between said arbiter output lines and said router input lines, for distributing packets having distinct destination addresses to said Banyan routers and selecting one of said Banyan routers responsive to a packet bit sequence comprising the network input port label bit sequence and the destination address bit sequence $(i_1, i_2, \ldots, i_k, o_1, o_2, \ldots, o_k)$ such that the distributed packets will not collide with any other packets while being routed through said Banyan router, said distribution means including a tag device for receiving a packet having a distinct destination address, selecting a Banyan router labeled $j = (o_{k-m+1} \ldots o_k)$, and transmitting the packet to one of said Banyan routers labeled with said j via one of said active router input lines, and $2^{k-m}$ active router output lines given by $x2^m+j$ wherein x is an integer with value $0 \leq x < (2^{k-m})$, and wherein said packets having a first bit of the destination address equal to 0 are routed to said router input lines having the labels $(0 \ldots i_m \ldots i_{k-1}1)$, and said packets having a first bit of the destination address equal to 1 are routed to said router input lines having the labels $(0 \ldots i_m \ldots i_{k-1}1)$, and said active router input lines being chosen sequentially after selection of the router input lines determined by the first bit of the destination address.

* * * * *

UNITED STATES PATENT AND TRADEMARK OFFICE
CERTIFICATE OF CORRECTION

PATENT NO. : 5,216,668

DATED : June 1, 1993

INVENTOR(S) : Ning Zhang

It is certified that error appears in the above-identified patent and that said Letters Patent is hereby corrected as shown below:

At Col. 3, line 13 after the word "sequence" kindly insert therefor --$(i_1, i_2, \ldots, i_k, o_1, o_2, \ldots, o_k)$.--

At Col. 4, line 14, kindly delete "of" and insert therefor
--FOR--.

At Col. 6, line 24, kindly delete "$(i_1 i_2 i_3 o_1 o_2 i_3)$" and insert therefor --$(i_1 i_2 i_3 o_1 o_2 o_3)$--.

At Col. 10, line 41, kindly delete "#760" and insert therefor --#0760--.

At Col. 13, line 8, after ";" kindly insert therefor --and--.

At Col. 14, line 42, after "$\ldots i_{k-1} 1)$" kindly insert therefor --$\ldots i_{k-1} 0)$--.

Signed and Sealed this

Twenty-second Day of March, 1994

Attest:

BRUCE LEHMAN

*Attesting Officer*    *Commissioner of Patents and Trademarks*